(12) United States Patent
Ma et al.

(10) Patent No.: US 9,356,359 B2
(45) Date of Patent: May 31, 2016

(54) ACTIVE ANTENNA SYSTEM (AAS) RADIO FREQUENCY (RF) MODULE WITH HEAT SINK INTEGRATED ANTENNA REFLECTOR

(71) Applicant: FutureWei Technologies, Inc., Plano, TX (US)

(72) Inventors: Zhengxiang Ma, Summit, NJ (US); Daniel Plaza, Mendham, NJ (US); Shengjun Ou, Bridgewater, NJ (US); Alexis Pierides, Piscataway, NJ (US); Minwei Gong, Wilmington, DE (US)

(73) Assignee: Futurewei Technologies, Inc., Plano, TX (US)

( * ) Notice: Subject to any disclaimer, the term of this patent is extended or adjusted under 35 U.S.C. 154(b) by 336 days.

(21) Appl. No.: 13/775,142

(22) Filed: Feb. 23, 2013

(65) Prior Publication Data

US 2013/0222201 A1    Aug. 29, 2013

Related U.S. Application Data

(60) Provisional application No. 61/603,086, filed on Feb. 24, 2012, provisional application No. 61/603,107, filed on Feb. 24, 2012, provisional application No. 61/603,122, filed on Feb. 24, 2012, provisional application No. 61/603,132, filed on Feb. 24, 2012.

(51) Int. Cl.
*H01Q 19/10* (2006.01)
*H01Q 3/26* (2006.01)
(Continued)

(52) U.S. Cl.
CPC .............. *H01Q 19/10* (2013.01); *H01Q 1/02* (2013.01); *H01Q 1/246* (2013.01); *H01Q 1/42* (2013.01);
(Continued)

(58) Field of Classification Search
CPC ....... H01Q 19/10; H01Q 19/106; H01Q 1/42; H01Q 21/205
USPC .............. 343/700 MS, 834, 837, 912, 781 R, 343/781 P, 833
See application file for complete search history.

(56) References Cited

U.S. PATENT DOCUMENTS 2,861,177 A    11/1958    Dishal et al.
4,949,090 A    8/1990    Tamii et al.
(Continued)

FOREIGN PATENT DOCUMENTS

CN    1553717 A    12/2004
CN    101032053 A    9/2007
(Continued)

OTHER PUBLICATIONS

Thomas, T., et al., "Experimental MIMO Comparisons of a 4-Element Uniform Linear Array to an Array of Two Cross Polarized Antennas at 3.5 GHz," IEEE 70th Vehicular Technology Conference Fall, Sep. 20-23, 2009, 5 pages.
(Continued)

*Primary Examiner* — Tho G Phan
(74) *Attorney, Agent, or Firm* — Slater Matsil, LLP

(57) ABSTRACT

On-board heat dissipation can be achieved in radio frequency (RF) modules by integrating a heat sink into the RF module's antenna reflector. Said integration achieves a compact and aesthetically pleasing RF module design that reduces the overall footprint of modular active antenna systems (AASs). Embodiment antenna reflectors include portions that are perforated and/or exposed to free flowing air to provide enhanced heat dissipation capability.

31 Claims, 10 Drawing Sheets

(51) Int. Cl.
*H04W 84/04* (2009.01)
*H01Q 1/02* (2006.01)
*H01Q 1/42* (2006.01)
*H01Q 1/24* (2006.01)
*H01Q 21/20* (2006.01)

(52) U.S. Cl.
CPC .............. *H01Q 3/26* (2013.01); *H01Q 19/106* (2013.01); *H04W 84/042* (2013.01); *H01Q 21/205* (2013.01)

(56) References Cited

U.S. PATENT DOCUMENTS

| | | | |
|---|---|---|---|
| 4,994,813 | A | 2/1991 | Shiramatsu et al. |
| 5,187,486 | A | 2/1993 | Kölzer |
| 5,294,934 | A | 3/1994 | Matsumoto |
| 5,477,229 | A | 12/1995 | Caille et al. |
| 5,530,449 | A | 6/1996 | Wachs et al. |
| 5,559,519 | A | 9/1996 | Fenner |
| 5,677,696 | A | 10/1997 | Silverstein et al. |
| 5,861,843 | A | 1/1999 | Sorace et al. |
| 5,929,809 | A | 7/1999 | Erlick et al. |
| 5,969,689 | A | 10/1999 | Martek et al. |
| 6,046,697 | A | 4/2000 | Overbury et al. |
| 6,127,966 | A | 10/2000 | Erhage |
| 6,134,422 | A | 10/2000 | Bobadilla et al. |
| 6,140,972 | A | 10/2000 | Johnston et al. |
| 6,163,296 | A | 12/2000 | Lier et al. |
| 6,188,373 | B1 | 2/2001 | Martek |
| 6,356,233 | B1 | 3/2002 | Miller et al. |
| 6,384,781 | B1 | 5/2002 | Kautz et al. |
| 6,507,315 | B2 | 1/2003 | Purdy et al. |
| 6,999,042 | B2 | 2/2006 | Dearnley et al. |
| 7,136,017 | B2 * | 11/2006 | Condon et al. ......... 343/700 MS |
| 7,199,753 | B2 | 4/2007 | Pauplis |
| 7,215,298 | B1 | 5/2007 | Fraschilla et al. |
| 7,868,843 | B2 | 1/2011 | Borau et al. |
| 7,916,082 | B1 | 3/2011 | Herting |
| 8,686,909 | B2 * | 4/2014 | Frank et al. .................... 343/761 |
| 2002/0171583 | A1 | 11/2002 | Purdy et al. |
| 2003/0032424 | A1 | 2/2003 | Judd et al. |
| 2003/0038746 | A1 | 2/2003 | Patel et al. |
| 2003/0038747 | A1 | 2/2003 | Patel et al. |
| 2003/0117315 | A1 | 6/2003 | Graham |
| 2004/0061644 | A1 | 4/2004 | Lier et al. |
| 2006/0071859 | A1 | 4/2006 | Condon et al. |
| 2006/0192710 | A1 | 8/2006 | Schieblich |
| 2006/0284768 | A1 | 12/2006 | Pauplis |
| 2007/0007898 | A1 * | 1/2007 | Bruning ......................... 315/34 |
| 2007/0210959 | A1 | 9/2007 | Herd et al. |
| 2007/0241978 | A1 | 10/2007 | Cheng |
| 2008/0129613 | A1 | 6/2008 | Ermutlu et al. |
| 2009/0153394 | A1 | 6/2009 | Navarro et al. |
| 2011/0032158 | A1 * | 2/2011 | Rodger et al. ................. 343/702 |
| 2011/0133982 | A1 | 6/2011 | Goshen et al. |
| 2011/0260944 | A1 | 10/2011 | Ferris |
| 2012/0020431 | A1 | 1/2012 | Tanabe et al. |
| 2012/0028587 | A1 | 2/2012 | Ferguson et al. |
| 2012/0206291 | A1 | 8/2012 | Schuman et al. |
| 2013/0120199 | A1 * | 5/2013 | Frank et al. .................... 343/719 |
| 2013/0225222 | A1 | 8/2013 | Ma et al. |
| 2013/0234883 | A1 | 9/2013 | Ma et al. |

FOREIGN PATENT DOCUMENTS

| | | |
|---|---|---|
| CN | 101904051 A | 12/2010 |
| CN | 102035061 A | 4/2011 |
| CN | 102347532 A | 2/2012 |
| EP | 2173005 A1 | 4/2010 |
| KR | 20100109761 A | 10/2010 |

OTHER PUBLICATIONS

Office Action received in Chinese Application No. 201380010437.7 dated Jun. 15, 2015, 6 pages.
Search Report received in Chinese Application No. 2013800104377 dated Jun. 6, 2015, 2 pages.

* cited by examiner

ACTIVE ANTENNA SYSTEM (AAS) RADIO FREQUENCY (RF) MODULE WITH HEAT SINK INTEGRATED ANTENNA REFLECTOR

This application claims the benefit of U.S. Provisional Application No. 61/603,086 entitled "Apparatus and Method for an Active Antenna System with RF Probes," U.S. Provisional Application No. 61/603,107 entitled "Apparatus and Method for a Modular Multi-Sector Active Antenna System for a Multi-Sector Small Cell Application," U.S. Provisional Application No. 61/603,122 entitled "Apparatus and Method for a Modular Multi-Sector Active Antenna System with a Heat Sinking Reflector," and U.S. Provisional Application No. 61/603,132 entitled "Apparatus and Method for a Modular Multi-Sector Active Antenna System," each of which were filed on Feb. 24, 2012 and are incorporated by reference herein as if reproduced in their entireties.

TECHNICAL FIELD

The present invention relates to an apparatus and method for wireless communications, and, in particular embodiments, to an Active Antenna System (AAS) Radio Frequency (RF) Module with Heat Sink Integrated Antenna Reflector.

BACKGROUND

Modern wireless networks use active antenna systems (AASs) to achieve increased performance on the wireless link. Active antennas are presently used in macro base stations (BSs), and it is foreseeable that active antennas will be deployed as small cell wireless transceivers in the near future. Accordingly, there is potentially significant market demand for compact, modular AAS designs that are cost effective, durable, and capable of being reliably installed and serviced in remote field locations.

SUMMARY

Technical advantages are generally achieved, by embodiments of this disclosure which describe an active antenna system with a heat sinking reflector.

In accordance with an embodiment, aspects of this disclosure provide an antenna comprising a radiating element and an antenna reflector configured to reflect electromagnetic signals radiated from the radiating element, and to dissipate heat generated by the antenna into free-flowing air.

In accordance with another embodiment, aspects of this disclosure provide an active antenna system (AAS) module comprising an antenna reflector having a radiating face, a radiating element fastened to a reflective face of the antenna reflector, and a radome affixed to the reflective face of the antenna reflector. The antenna reflector is structurally configured to dissipate heat. The radome at least partially surrounds the radiating element.

In accordance with another embodiment, aspects of this disclosure provide a method for operating an active antenna. In this example, the method includes transmitting or receiving a wireless signal by a radiating element of the active antenna. The wireless signal is at least partially reflected by an antenna reflector of the active antenna. The antenna reflector is configure to dissipate heat from the antenna reflector to free flowing air.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Figure 3B:
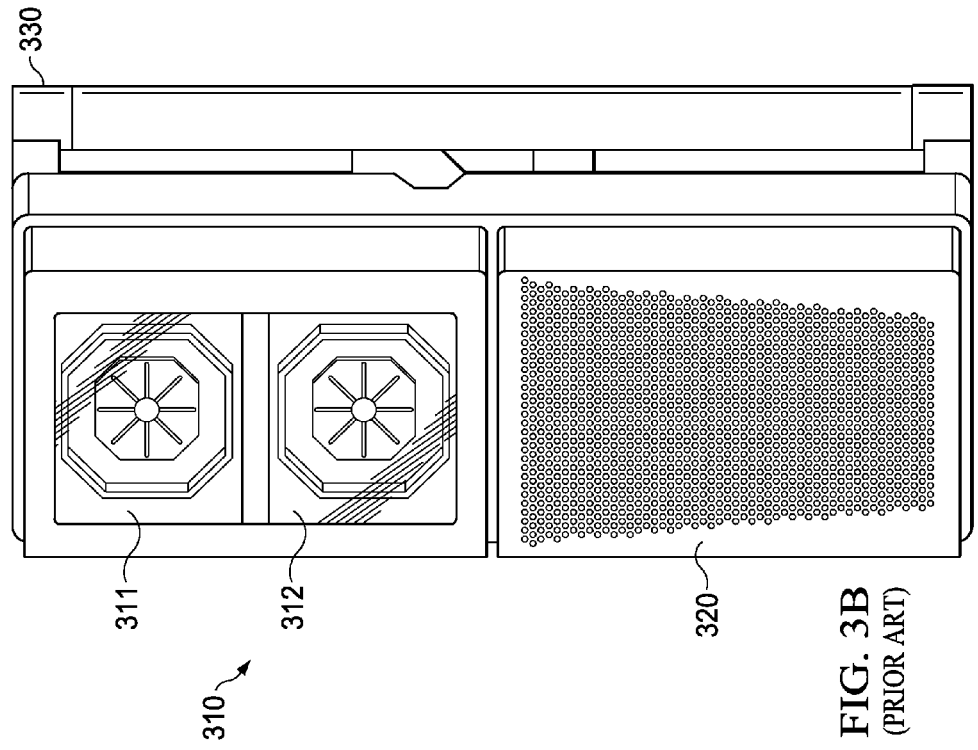
FIG. 3B illustrates a modular AAS installation of the prior art RF module.

One challenge in designing compact and durable AASs is that active antennas typically generate significantly more heat than passive antennas due to, inter alia, their inclusion of active RF components, e.g., power amplifiers, receivers, digital signal processing components, etc. As a result of this increased heat dissipation, active antennas may typically require some means for thermal dissipation, such as a heat sink or heat exchanger. Today's RF modules, such as Alcatel-Lucent's (ALU's) lightradio cube, lack on-board thermal dissipation, and therefore must typically be paired with an external heat exchanger. Consequently, the ALU lightradio cube and other prior art modular AASs tend to exhibit bulky installations despite the otherwise compact nature of the individual RF modules, as can be seen in FIG. 3B below. Accordingly, RF module designs that incorporate on-board thermal dissipation are desired in order to achieve compact modular AAS installation.

Aspects of this disclosure incorporate on-board heat dissipation capability into the antenna reflector of RF modules, thereby providing compact AASs installation by circumventing the need for accompanying external heat exchangers. More specifically, an on-board heat sink is strategically integrated into the RF module's antenna reflector to achieve a compact and aesthetically pleasing RF module design that reduces the overall footprint of the modular AAS installation.

Notably, embodiment antenna reflectors may include portions that are perforated and/or exposed to free flowing air in order to provide enhanced heat dissipation capability.

Figure 1:
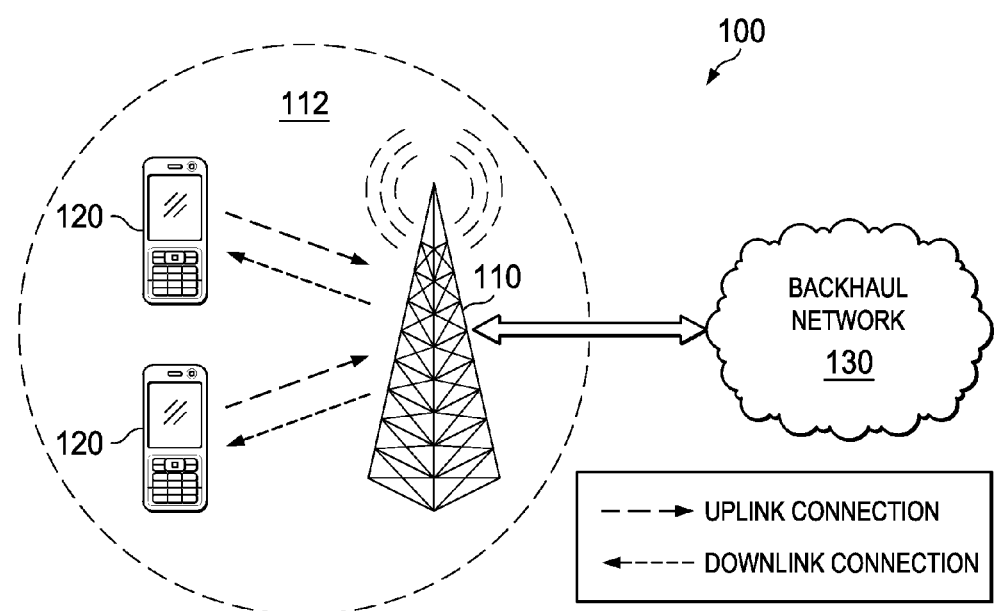
FIG. 1 illustrates a diagram of a wireless network for communicating data.

FIG. 1 illustrates a network 100 for communicating data. The network 100 comprises an access point (AP) 110 having a coverage area 112, a plurality of user equipments (UEs) 120, and a backhaul network 130. The AP 110 may include a modular AAS that is capable of providing wireless access by, inter alia, establishing uplink (dashed line) and/or downlink (dotted line) connections with the UEs 120. The AP 110 may be a macro base station, an enhanced base station (eNB), a pico base station, a micro base station, a femtocell, or any other device configured to provide wireless access to wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figures 2A, 2B:
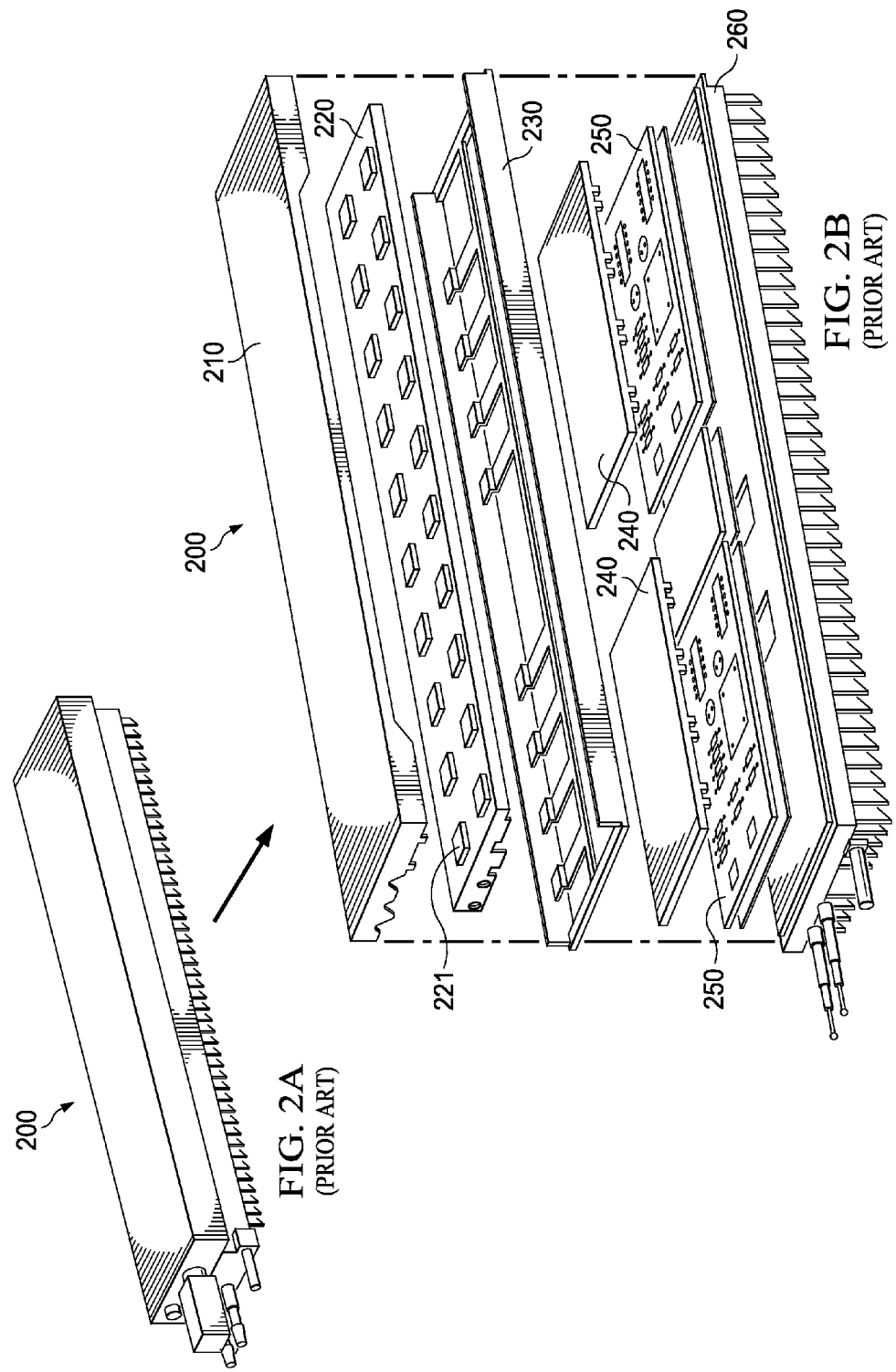
FIG. 2A illustrates a diagram of a conventional AAS.
FIG. 2B illustrates a diagram of internal components of the conventional AAS.

In conventional, non-modular, AASs, the heat sink is separate from the heat reflector. FIGS. 2A-2B illustrate a conventional non-modular AAS 200, as may be common place in present day wireless access networks. As shown, the conventional non-modular AAS 200 includes a radome 210, an antenna reflector 220, a plurality of antenna elements 221, an internal frame 230, a plurality of duplexers 240, an active circuit board 250, and a heat exchanger 260. Notably, the radome 210 affixes to the heat exchanger 260 to form an air-tight cavity, which shields the antenna elements 221 and other components of the non-modular AAS 200 from environmental contaminates. As a result, no portion of the antenna reflector 220 is exposed to free-flowing air, which prevents the antenna reflector 220 from providing meaningful thermal dissipation in the non-modular AAS 200.

Figure 3A:
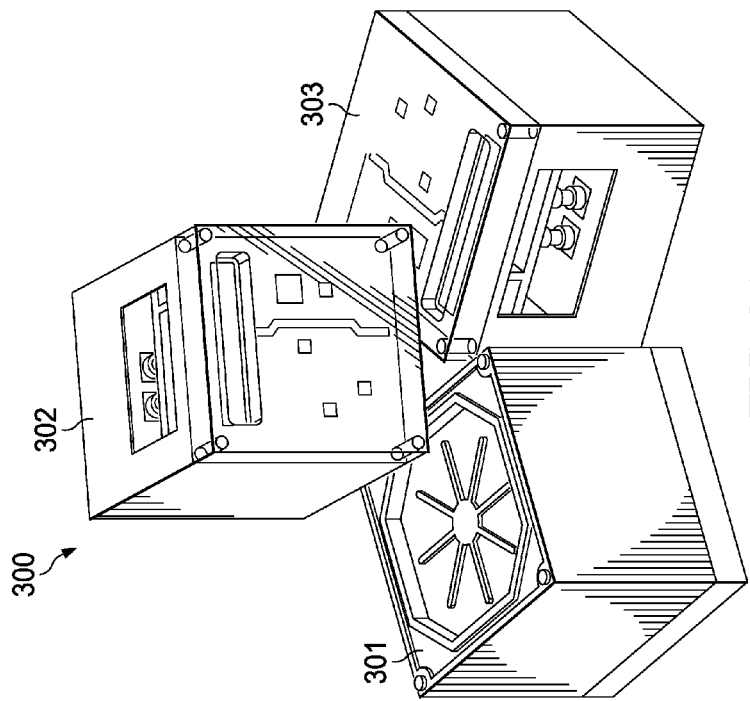
FIG. 3A illustrates a diagram of a prior art RF module.

Presently available modular AAS systems do not incorporate on-board thermal dissipation. FIG. 3A depicts a plurality of ALU lightradio cube RF modules 301-303 which have components (e.g., radiating elements, antenna reflector, etc.) for achieving active antenna functionality, but otherwise lack sufficient thermal dissipation capability. As a result, the ALU lightradio cube RF modules 301-303 must be installed with external heat exchangers, which increases the footprint of the modular AASs. FIG. 3B illustrates a modular AAS 310 comprising a pair of ALU lightradio cube RF modules 311-312 and an external heat exchanger 320 mounted on a frame 330. As shown, the inclusion of the external heat exchanger 320 significantly increases the footprint of the modular AAS 310, despite the otherwise compact nature of the ALU lightradio cube RF modules 311-312.

Figure 4A:
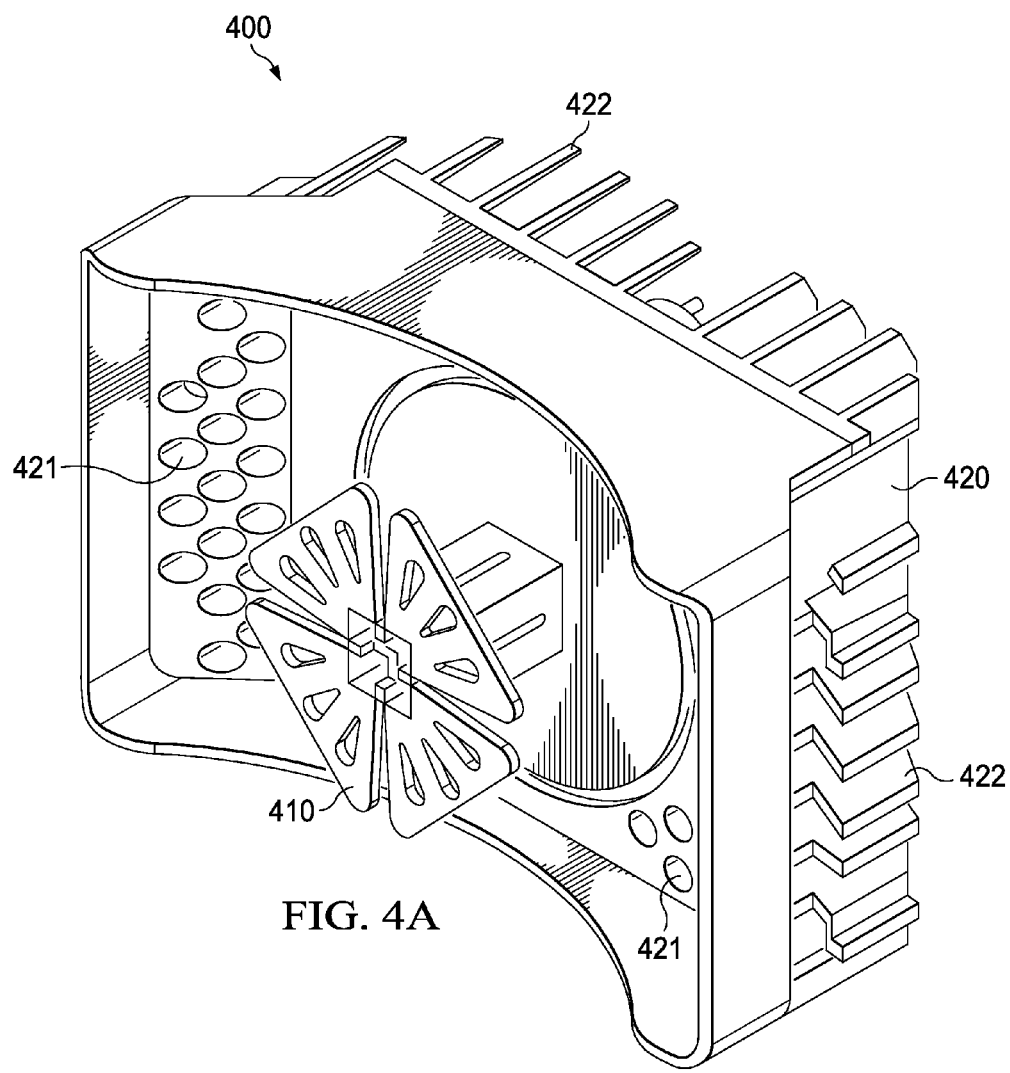
FIG. 4A illustrates a diagram of internal components of an embodiment RF module.
Figure 4B:
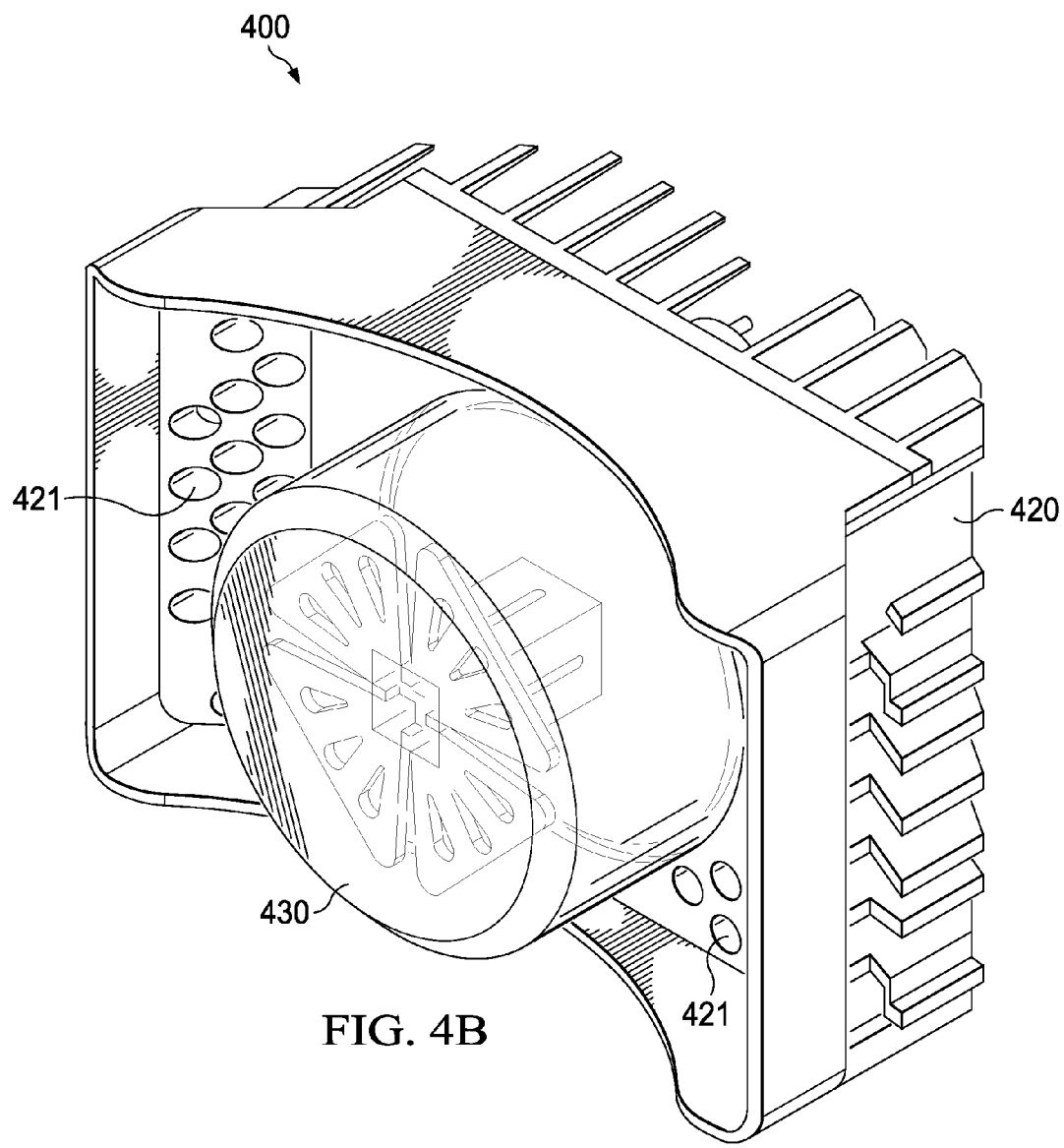
FIG. 4B illustrates a diagram of additional internal components of the embodiment RF module.
Figure 4C:
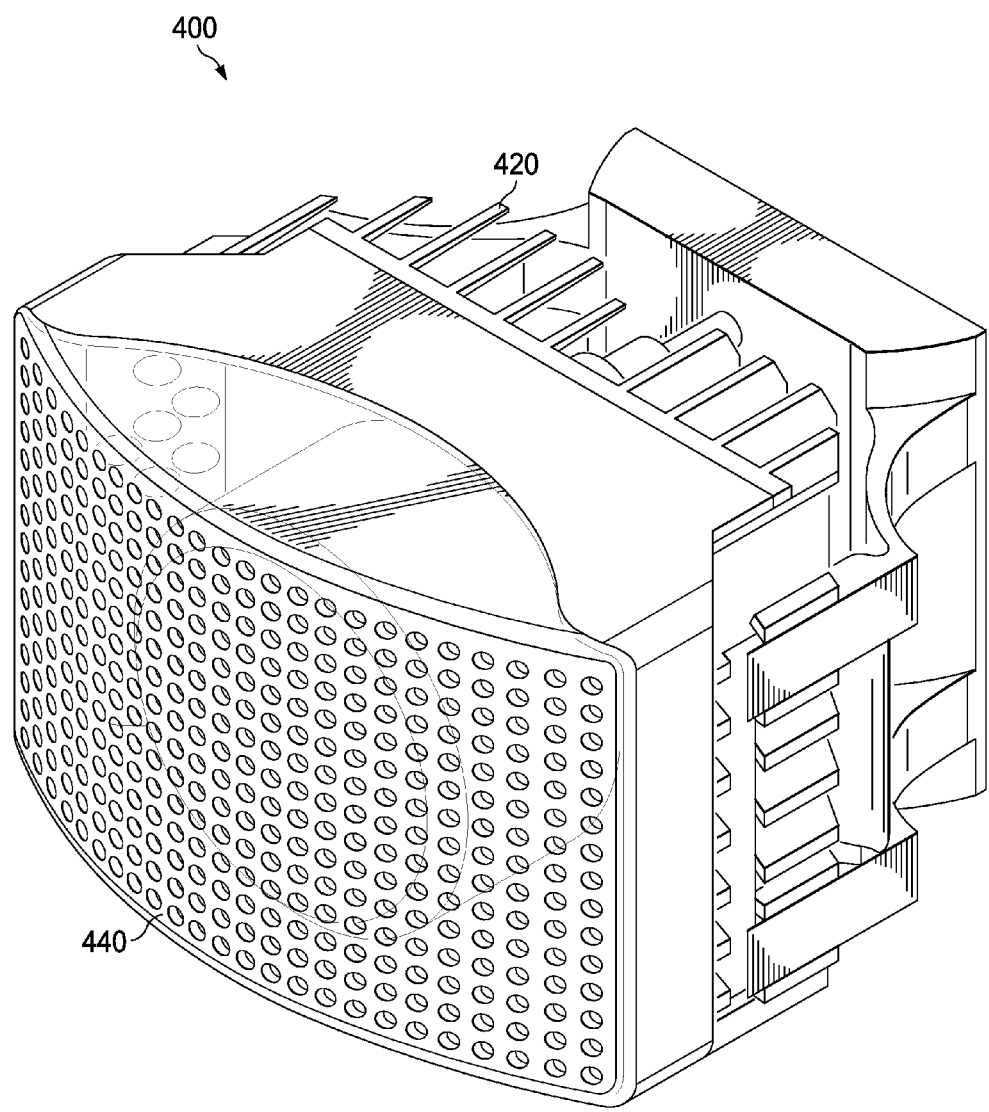
FIG. 4C illustrates a diagram of an assembled embodiment RF module.

More compact modular AAS installation can be achieved by integrating an on-board heat sink into the antenna reflector of the RF modules. FIGS. 4A-4C illustrate various layers of an embodiment RF module 400 that incorporates on-board thermal dissipation. As shown in FIG. 4A, the RF module 400 comprises a radiating element 410 affixed to an antenna reflector 420. Notably, the antenna reflector 420 also serves as a heat sink, and has various perforations 421 and/or heat dissipating fins 422 that are exposed to free-flowing air. In some embodiments, the antenna reflector 420 has a reflecting face upon which the radiating element 410 is affixed as well as one or more heat dissipating faces. For instance, in the FIG. 4A, the front face of the antenna reflector 420 serves as a reflecting face, while the other faces (e.g., rear, side, bottom, and top) of the antenna reflector 420 serve primarily as heat dissipating faces.

Notably, the reflecting face of the antenna reflector 420 may also serve to dissipate heat in at least some capacity, as portions of the reflecting face of the antenna reflector 420 may be exposed to free flowing air. FIG. 4B illustrates how a radome 430 of the embodiment RF module 400 is configured to encase the radiating element 410 while still allowing portions of the reflecting face of the antenna reflector 410 to remain exposed to free flowing air. To wit, the perforations 421 are positioned on exposed portions of the reflecting face of the antenna reflector 410. Optionally, the RF module 400 may include a perforated enclosure 440 that encases substantially all (or at least, significant portions) of the reflecting face of the antenna reflector 410, as shown in FIG. 4C. The perforated enclosure 440 may be configured to provide structural protection, but may not substantially restrict free-flowing air from passing over exposed portions of the reflecting face of the antenna reflector 410, e.g., portions of the reflecting face of the antenna reflector 410 that are not encase-ably sealed within the cavity formed by radome 430.

Figure 5A:
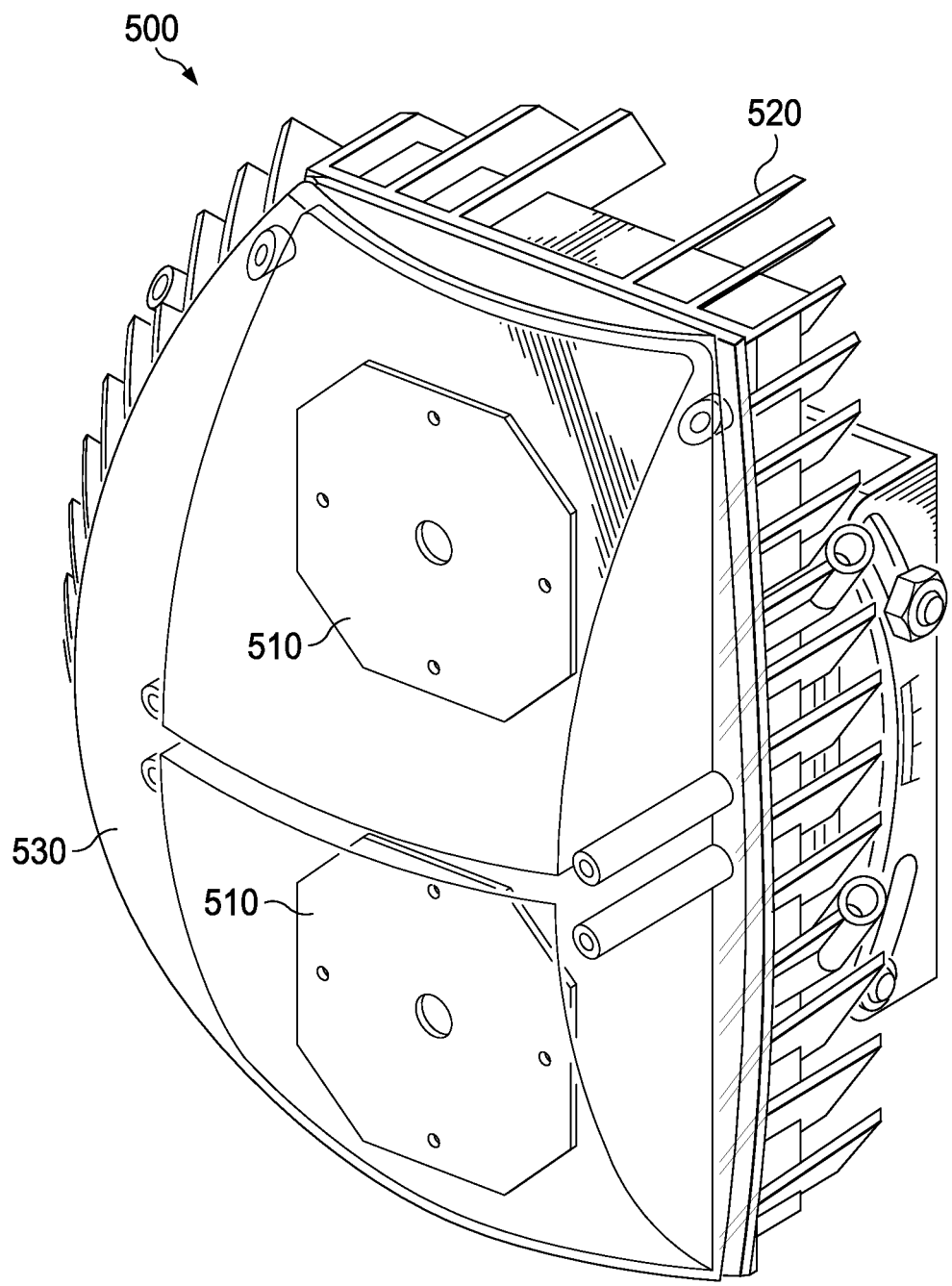
FIG. 5A illustrates a diagram of an angled perspective of an embodiment RF module.
Figure 5B:
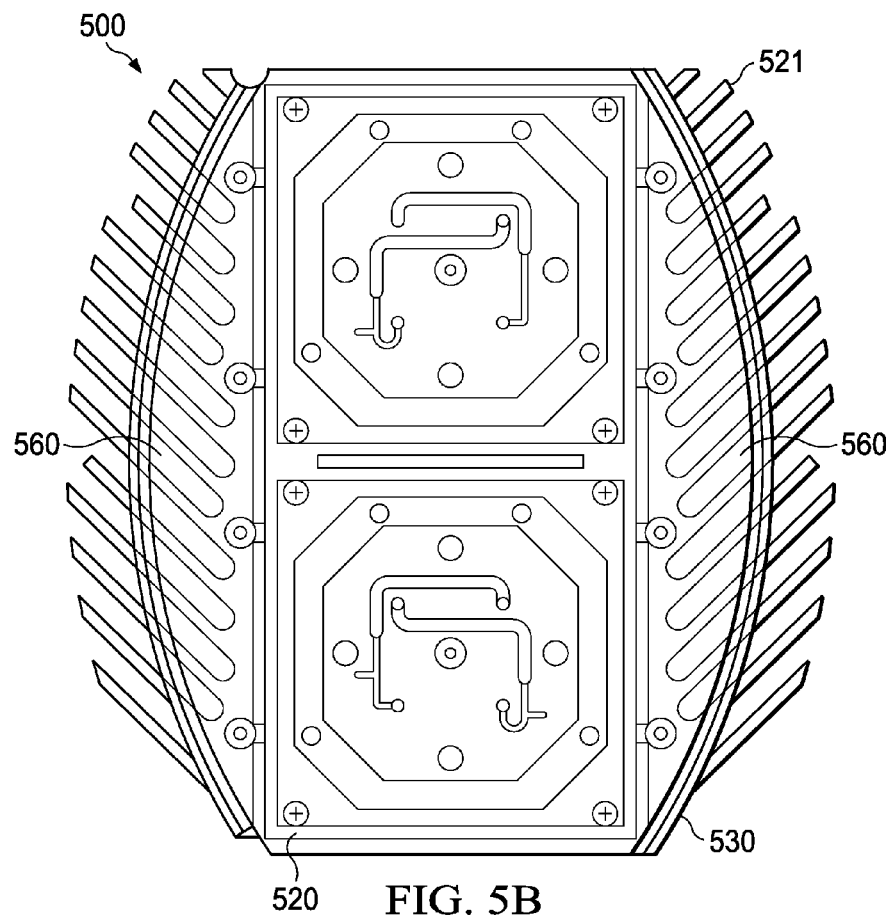
FIG. 5B illustrates a diagram of a front perspective of the embodiment RF module.
Figure 5C:
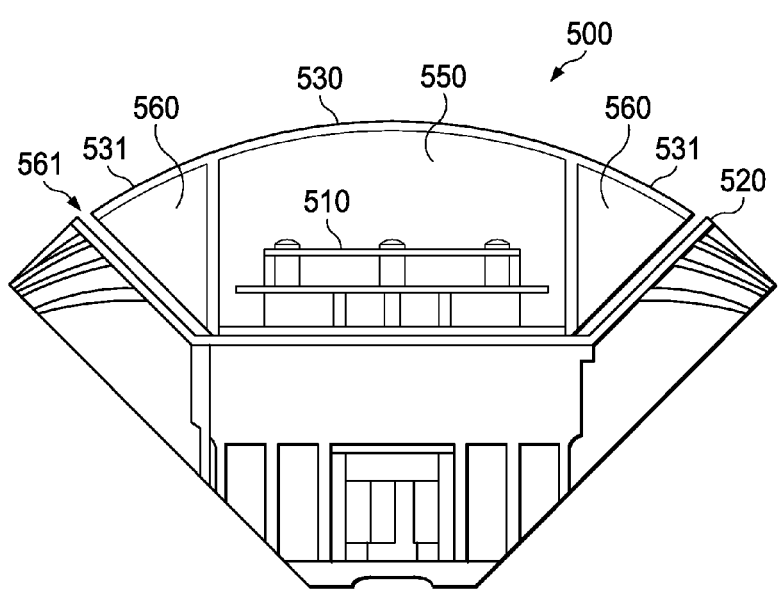
FIG. 5C illustrates a diagram of a top-down perspective of the embodiment RF module.

Different embodiment RF modules may incorporate different designs. For instance, some designs may incorporate a flared radome in lieu of the perforated enclosure. FIGS. 5A-5C illustrates an RF module 500 that includes a flared radome 530. The flared radome 510 is affixed to the antenna reflector 520 such that a sealed cavity 550 encases the antenna element 510, as can be clearly seen in the FIG. 5C. Further, the flared radome 510 has flanged portions 531 that protrude over portions of the reflective face of the antenna reflector 520 that are not encased with the sealed cavity 550, thereby forming unsealed pockets 560. Notably, there is a gap 561 between the antenna reflector 520 and the flanged portions 531 of the flared radome 510, such that free flowing air may circulate within the unsealed pockets 560 to dissipate heat. Further, as clearly seen in the FIG. 5B, the exposed portions of the reflective face of the antenna reflector 520 include slot-type perforations 521 to allow the circulation of free-flowing air.

Figure 6:
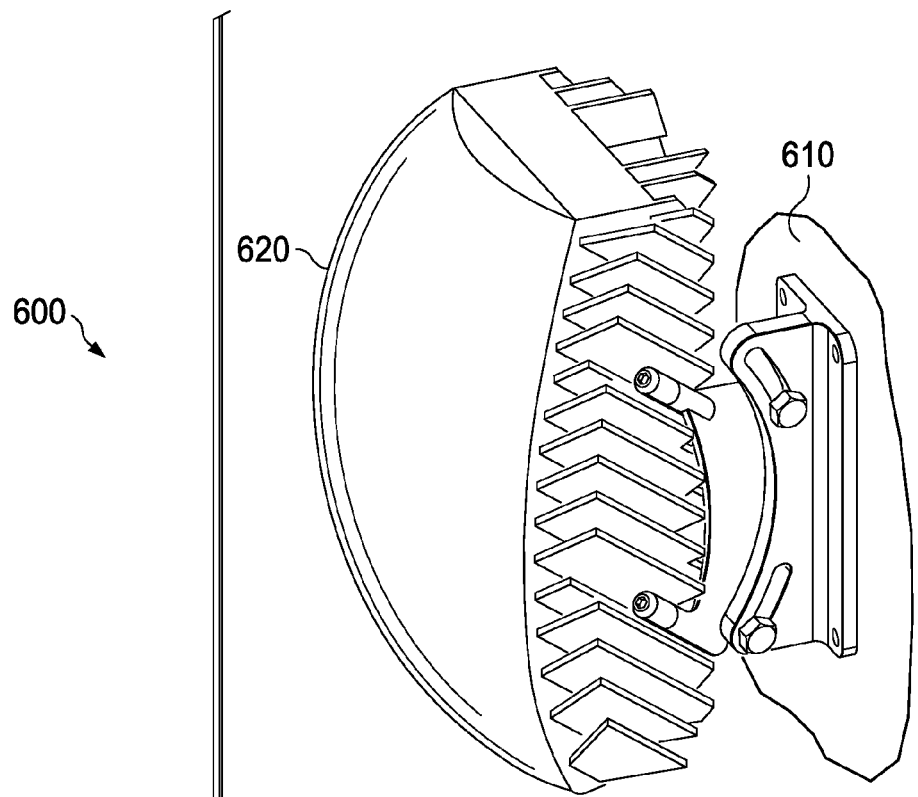
FIG. 6 illustrates a diagram of an embodiment modular AAS installation.
Figure 6:
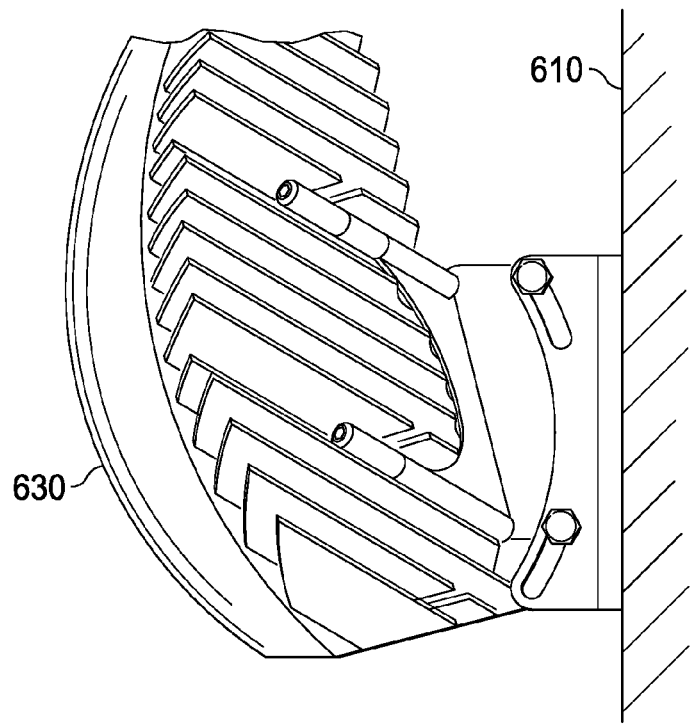
Figure 7:
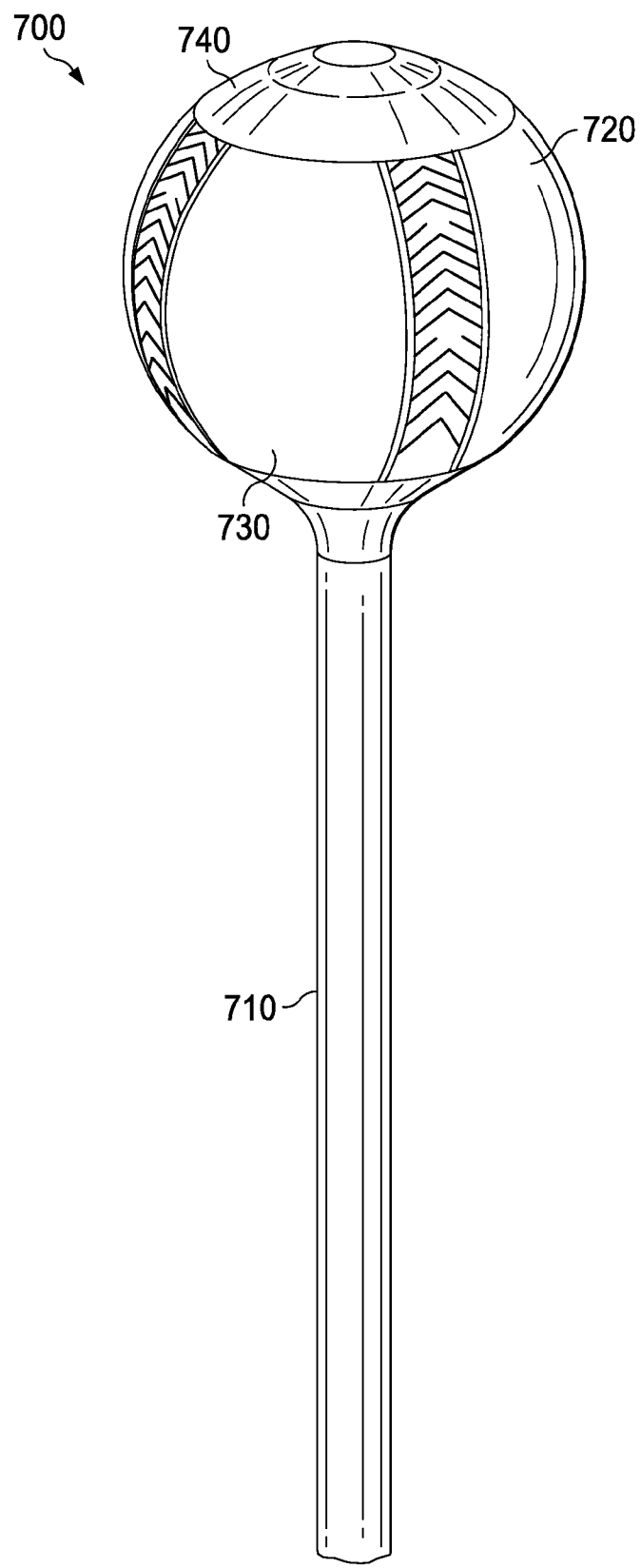
FIG. 7 illustrates a diagram of another embodiment modular AAS installation.

The embodiment RF modules of this disclosure enable various compact modular AAS installations. For instance, FIG. 6 illustrates a compact modular AAS installation 600 where an RF modules 620-630 are affixed to a wall 610, while FIG. 7 illustrates a compact modular AAS installation 700 where an array of RF modules 720-740 are affixed to a poll 710. Countless other modular AAS installations are also possible by virtue of the concepts described herein.

An embodiment active antenna system with enhanced thermal dissipation may include an exposed antenna reflector with perforations that allow airflow to increase the thermal dissipation without negatively impacting the antenna performance. Integration of the heat sink within the antenna reflector significantly reduces the overall volume, weight and cost of a modular AAS apparatus. An embodiment of this disclosure includes a perforated antenna reflector to allow airflow for better heat sink efficiency. Another embodiment of this disclosure combines cooling fins and the antenna reflector. Alone or together, these embodiments generally increase the cooling capability and reduce the volume, weight and cost of the system.

Another embodiment of this disclosure includes a perforated antenna reflector and/or an integrated heat sink and antenna reflector, which may reduce the size, weight and cost of modular AASs. Embodiments of this disclosure may be implemented as part of mobile broadband infrastructures. A modular AAS system may include multiple independent RF modules that work together as an active antenna system, with each module containing one or more antenna elements and one or more transceivers.

In some embodiments, perforations on the antenna reflector may be designed so as not to adversely impact antenna performance. For instances, the dimensions (length, width, diameter, etc.) of the perforations (slot-type, circular, or otherwise) may be selected in accordance with the wavelength, e.g., less than about 0.5 lambda.

Through the use of a single design element having dual functions, namely reflector and heat sink, and exposing the reflector to airflow, an embodiment achieves higher efficiency heat dissipation within limited space, and lower usage of metal material for weight and cost reduction. By either perforating the reflector to allow air flow or integrating the perforated reflector with the heat sink, the following benefits can be obtained in various embodiments. First, the heat dissipating capability of the module is effectively increased, so that higher RF output power can be supported. Second, efficient use of space for heat dissipation reduces the overall volume of the design. Third, efficient use of metal material also reduces the overall weight and cost of the design.

While aspects of this disclosure have been described with reference to illustrative embodiments, this description is not intended to be construed in a limiting sense. Various modifications and combinations of the illustrative embodiments, as well as other embodiments of this disclosure, will be apparent to persons skilled in the art upon reference to the description. It is therefore intended that the appended claims encompass any such modifications or embodiments.

What is claimed is:

1. An antenna comprising:
   a radiating element; and
   an antenna reflector comprising a reflective face configured to reflect electromagnetic signals radiated from the radiating element, and a heat dissipating face configured to dissipate heat generated by the antenna into free-flowing air, the heat dissipating face facing away from the radiating element, the reflective face of the antenna reflector and the heat dissipating face of the antenna reflector being different faces on the same physical component.

2. The antenna of claim 1, wherein the antenna reflector is the primary heat exchanger for the antenna.

3. The antenna of claim 1, wherein the antenna reflector is perforated.

4. The antenna of claim 1, wherein the radiating element is affixed to the reflecting face of the antenna reflector.

5. The antenna of claim 4, wherein the heat dissipating face of the antenna reflector is exposed to the free-flowing air, and wherein the radiating element is at least partially enclosed within a cavity formed between a radome and the reflective face of the antenna reflector.

6. The antenna of claim 5, wherein the heat dissipating face comprises a plurality of heat dissipating fins, the heat dissipating fins facing away from the antenna reflector.

7. The antenna of claim 5, wherein the reflective face of the antenna reflector includes perforations, the perforations of the reflective face enabling free-flowing air to pass through the reflective face of the antenna reflector to the heat dissipating face of the antenna reflector.

8. The antenna of claim 7, wherein the perforations have dimensions smaller than a smallest wavelength radiated by the radiating element during normal operation.

9. The antenna of claim 7, wherein the perforations have dimensions smaller than or equal to lambda/2, where lambda is a smallest wavelength radiated by the radiating element during normal operation.

10. The antenna of claim 1, wherein the heat dissipating face of the antenna reflector faces in an opposite direction from the reflective face of the antenna reflector, and wherein the reflective face of the antenna reflector is smooth and devoid of protrusions.

11. The antenna of claim 1, wherein the heat dissipating face of the antenna reflector and the reflective face of the antenna reflector are formed from the same piece of metal material.

12. An active antenna system (AAS) module comprising:
    an antenna reflector having a reflective face and a heat dissipating face, the heat dissipating face configured to dissipate heat generated by the AAS into free-flowing air;
    a radiating element fastened to the reflective face of the antenna reflector, the reflective face configured to reflect electromagnetic signals radiated from the radiating element, the heat dissipating face of the antenna reflector facing away from the radiating element, the reflective face of the antenna reflector and the heat dissipating face of the antenna reflector being different faces on the same physical component; and
    a radome affixed to the reflective face of the antenna reflector, wherein the radiating element is at least partially enclosed within a cavity formed between the radome and the reflective face.

13. The AAS of claim 12, wherein the antenna reflector is the primary heat exchanger for the AAS.

14. The AAS of claim 12, wherein the cavity is a weatherproof cavity formed over an encased portion of the reflective face of the antenna reflector, and wherein a non-encased portion of the reflective face of the antenna reflector remains exposed to free-flowing air.

15. The AAS of claim 14, wherein the non-encased portion of the reflective face of the antenna reflector includes perforations.

16. The AAS of claim 15, wherein the perforations are slots.

17. The AAS of claim 15, wherein the perforations are curved.

18. The AAS of claim 15, wherein the perforations are circular.

19. The AAS of claim 15, wherein a widest dimension of the perforations is shorter than a smallest wavelength radiated by the radiating element during normal operation.

20. The AAS of claim 15, wherein a widest dimension of the perforations is less than or equal to lambda/2, where lambda is a smallest wavelength radiated by the radiating element during normal operation.

21. The AAS of claim 15, wherein the perforations are smaller than an average wavelength radiated by the radiating element during normal operation.

22. The AAS of claim 14, wherein the perforations are smaller than or equal to lambda/2, where lambda is an average wavelength radiated by the radiating element during normal operation.

23. The AAS of claim 12, wherein the heat dissipating face of the antenna reflector includes a plurality of heat dissipating fins facing away from the antenna reflector.

24. The AAS of claim 23, wherein the heat dissipating face is exposed to free-flowing air.

25. The AAS of claim 23, wherein the heat dissipating face is different than the reflective face.

26. The AAS of claim 12, wherein the heat dissipating face of the antenna reflector faces in an opposite direction from the reflective face of the antenna reflector, the reflective face of the antenna reflector configured to reflect electromagnetic signals radiated from the radiating element, and wherein the reflective face of the antenna reflector is smooth and devoid of protrusions.

27. The AAS of claim 12, wherein the heat dissipating face of the antenna reflector and the reflective face of the antenna reflector are formed from the same piece of metal material.

28. A method for operating an active antenna, the method comprising:
   transmitting or receiving a wireless signal by a radiating element of the active antenna, wherein the wireless signal is at least partially reflected by an antenna reflector of the active antenna; and
   dissipating heat from a heat dissipating face of the antenna reflector to free flowing air, the heat dissipating face of the antenna reflector facing away from the radiating element of the active antenna, and the reflective face of the antenna reflector and the heat dissipating face of the antenna reflector being formed from the same piece of metal material.

29. The method of claim 28, wherein the antenna reflector includes perforations.

30. The method of claim 28, wherein the heat dissipating face of the antenna reflector includes heat dissipating fins facing away from the radiating element.

31. The method of claim 28, wherein the heat dissipating face of the antenna reflector and the reflective face of the antenna reflector are formed from the same piece of metal material.

\* \* \* \* \*